US012674957B2

(12) United States Patent
Koiwai et al.

(10) Patent No.: US 12,674,957 B2
(45) Date of Patent: Jul. 7, 2026

(54) LENS BARREL AND IMAGE PICKUP APPARATUS HAVING THE SAME

(71) Applicant: CANON KABUSHIKI KAISHA, Tokyo (JP)

(72) Inventors: Kenta Koiwai, Tochigi (JP); Kenta Takai, Kanagawa (JP); Toshihiro Ogawa, Tokyo (JP); Tadanori Okada, Tochigi (JP); Hyochoru Tanaka, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 334 days.

(21) Appl. No.: 18/605,970

(22) Filed: Mar. 15, 2024

(65) Prior Publication Data

US 2024/0319477 A1 Sep. 26, 2024

(30) Foreign Application Priority Data

Mar. 23, 2023 (JP) ................................. 2023-046248

(51) Int. Cl.
*G02B 7/10* (2021.01)
*G02B 13/00* (2006.01)
*G03B 3/10* (2021.01)

(52) U.S. Cl.
CPC ........... *G02B 7/102* (2013.01); *G02B 13/009* (2013.01); *G03B 3/10* (2013.01)

(58) Field of Classification Search
CPC ......... G02B 7/102; G02B 13/009; G03B 3/10
See application file for complete search history.

(56) References Cited

U.S. PATENT DOCUMENTS

| | | | |
|---|---|---|---|
| 2015/0205068 A1* | 7/2015 | Sasaki | G03B 3/10 |
| | | | 359/700 |
| 2022/0308311 A1 | 9/2022 | Okuda et al. | |
| 2022/0350222 A1 | 11/2022 | Sasaki et al. | |

FOREIGN PATENT DOCUMENTS

| | | |
|---|---|---|
| JP | 2017227825 A | 12/2017 |
| JP | 2022148164 A | 10/2022 |
| JP | 2022170045 A | 11/2022 |

* cited by examiner

*Primary Examiner* — Lin Ye
*Assistant Examiner* — Fayez A Bhuiyan
(74) *Attorney, Agent, or Firm* — ROSSI, KIMMS & McDOWELL LLP

(57) ABSTRACT

A lens barrel includes first and second holding members configured to hold first and second lens units movable in an optical axis direction, a transmission member configured to move the second holding member in the optical axis direction, a driving unit configured to move the transmission member in the optical axis direction, a processor configured to control the driving unit, and a first output unit configured to output information about a position of the first holding member. Moving ranges of the first and second lens units overlap each other in the optical axis direction by a predetermined amount. The second holding member includes a biasing member. The lens barrel has a first state for restricting driving of the driving unit, and a second state for permitting driving of the driving unit. The processor determines whether the lens barrel is in the first or second state, using an output result from the first output unit.

12 Claims, 12 Drawing Sheets

FIG. 11A   P1
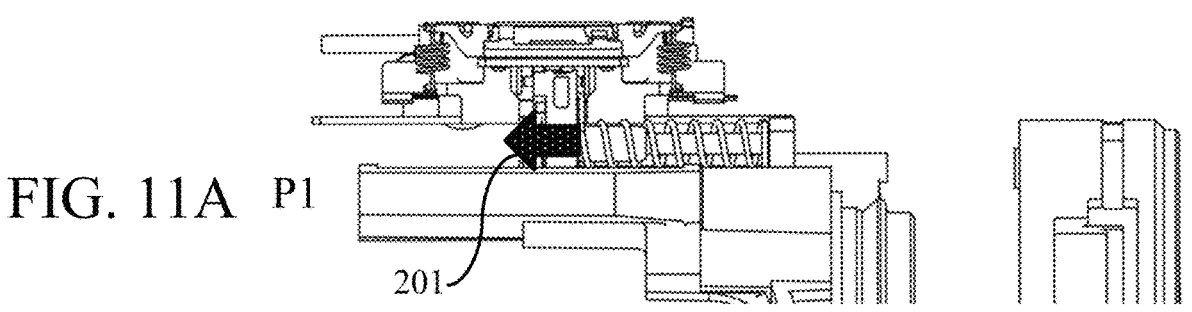
201
FIG. 11B   P3
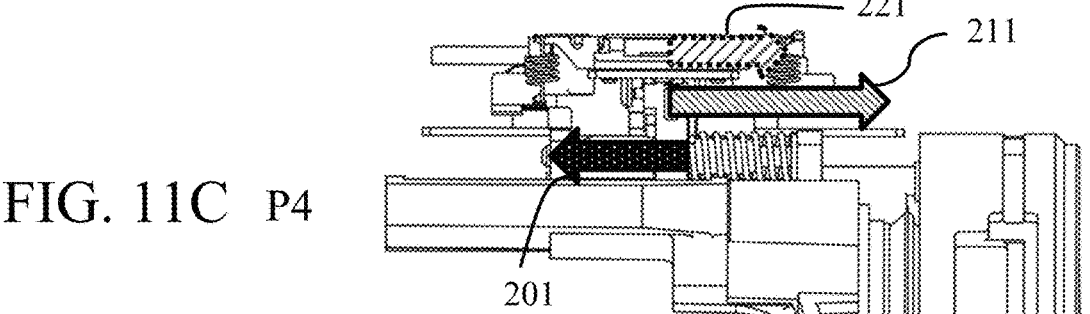
221   211
201
FIG. 11C   P4
221   211
201
FIG. 11D   P5
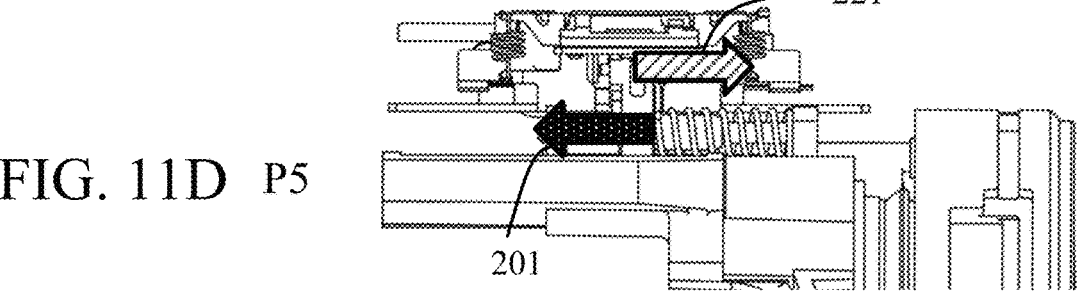
221
201

PRIOR ART

PRIOR ART

P1

201

P3

221

211

201

P4

221

201

LENS BARREL AND IMAGE PICKUP APPARATUS HAVING THE SAME

BACKGROUND

Technical Field

One of the aspects of the embodiments relates generally to a lens barrel, and more particularly to a lens barrel having a lens unit that is movable by a manual operation or by an external driving unit and a lens unit that is movable by an electric driving unit.

Description of Related Art

In order to reduce the shortest overall length of a zoom lens, a configuration has been conventionally proposed that enables a lens unit movable by a manual operation or by an external driving unit to enter a moving range of a lens unit movable by an electric driving unit (such as a focus lens unit). Japanese Patent Laid-Open No. 2022-148164 discloses a configuration that absorbs impact between lens units by displacing a biasing member when a first holding member that holds a first lens unit interferes with a second holding member that holds a second lens unit that moves according to the driving force of a driving unit. Japanese Patent Laid-Open No. 2022-148164 further discloses a configuration that changes the control of the driving unit before the first and second holding members interfere with each other.

The configuration disclosed in Japanese Patent Laid-Open No. 2022-148164 does not change control of driving of the driving unit for each situation while the first and second holding members interfere with each other, but controls the driving of the driving unit to always provide an optical use area. A large interference amount causes a large biasing force by the biasing member. In a case where the driving unit is driven while the biasing force by the biasing member is large and the driving unit is a piezoelectric actuator, a movable unit may slip and be worn out. In addition, in a case where the driving unit is a stepping motor connected to a lead screw, a transmission member may slip and cause a cog jump. Thereby, focusing performance may deteriorate.

SUMMARY

A lens barrel according to one aspect of the disclosure includes a first holding member configured to hold a first lens unit that is movable in an optical axis direction, a second holding member configured to hold a second lens unit that is movable in the optical axis direction, a transmission member configured to move the second holding member in the optical axis direction, a driving unit configured to move the transmission member in the optical axis direction, a processor configured to control the driving unit, and a first output unit configured to output information about a position of the first holding member. A moving range of the first lens unit and a moving range of the second lens unit overlap each other in the optical axis direction by a predetermined amount. The second holding member includes a biasing member that is deformable in the optical axis direction by at least the predetermined amount to a side opposite to the first holding member relative to the transmission member. The lens barrel has a first state for restricting driving of the driving unit, and a second state for permitting driving of the driving unit. The processor determines whether the lens barrel is in the first state or the second state, using an output result from the first output unit. An image pickup apparatus having the above lens barrel also constitutes another aspect of the disclosure.

Further features of various embodiments of the disclosure will become apparent from the following description of embodiments with reference to the attached drawings.

BRIEF DESCRIPTION OF THE DRAWINGS

FIGS. 11A, 11B, 11C, and 11D illustrate force relationships in FIG. 10.

DESCRIPTION OF THE EMBODIMENTS

Figures 1, 2:
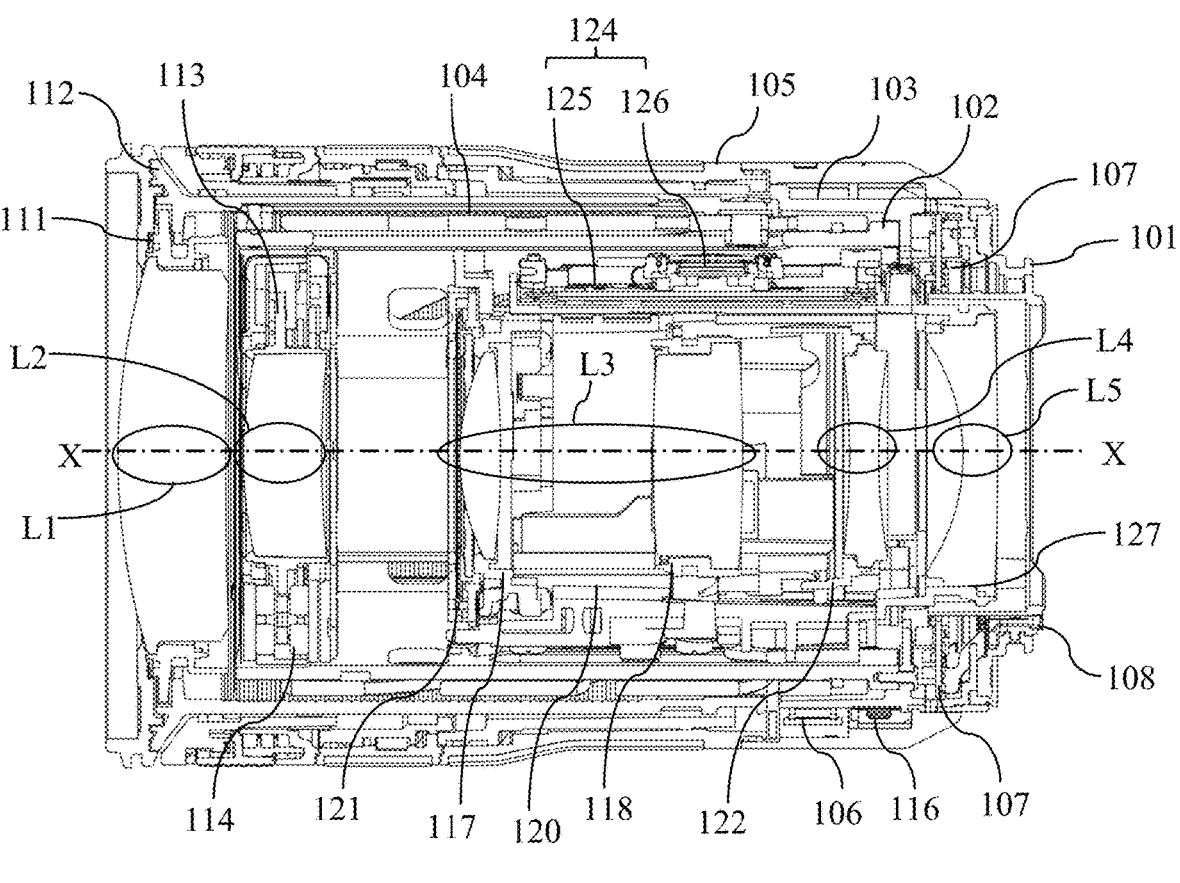
FIG. 1 is a sectional view of a lens barrel according to a first embodiment.
FIG. 2 illustrates a moving locus of each lens in the first embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

First Embodiment

FIG. 1 is a sectional view of a lens barrel according to this example. In FIG. 1, a line indicated by X-X represents an optical axis. In this embodiment, the lens barrel is attachable to and detachable from an unillustrated camera body (image pickup apparatus) that includes an image sensor configured to receive light from the lens barrel. The lens barrel may be integrated with the camera body.

A mount 101 is a component fixed to the camera body. A guide barrel 102 and a fixed barrel 103 are integrally fixed to the mount 101. A cam ring 104 is held on the outer circumference of the guide barrel 102 rotatably around the optical axis. A zoom ring 105 is rotatably held on the outer circumference of the fixed barrel 103 and connected to the cam ring 104 by an unillustrated key member. Operating the zoom ring 105 from the outside can integrally rotate the cam ring 104 and the zoom ring 105.

A zoom sensor 106 is attached to the fixed barrel 103, acquires the zoom position (focal length information) by electrically detecting a rotation angle of the zoom ring 105, and outputs the acquired zoom position to a control board (control unit) 107. In this embodiment, the zoom sensor 106 functions as a first output unit. The zoom sensor 106 may detect, for example, the position of a fifth barrel 127, which will be described below, as long as the zoom position can be acquired. The control board 107 is disposed near the mount 101, is electrically connected to the zoom sensor 106, and acquires the zoom position from the zoom sensor 106. The control board 107 is electrically connected to a contact block 108 to communicate with the camera body and receive power from the camera body.

A first lens unit L1 is fixed to the first barrel 111. The first barrel 111 is fixed to a linear movement barrel 112.

A second lens unit L2 is held by a second barrel 113. The second barrel 113 is held by a shift unit 114 movably within a plane orthogonal to the optical axis. The shift unit 114 includes an actuator configured to drive the second barrel 113, a sensor configured to detect a driving amount of the second barrel 113, and the like, and is fixed to the guide barrel 102. The shift unit 114 is electrically connected to control board 107. The control board 107 controls the second barrel 113 to correct the shake (for image stabilization) based on a shake signal detected by the shake sensor 116 attached to the fixed barrel 103.

A third lens unit L3 is held by a first partial barrel 117 and a second partial barrel 118, and is fixed to a third base barrel 120. An electromagnetic aperture stop unit 121 is held by the third base barrel 120 and electrically connected to the control board 107.

A fourth lens unit (second lens unit) L4 is held by a fourth barrel (second holding member) 122. The fourth barrel 122 is held by the third base barrel 120 through a guide bar 123 movably in the optical axis direction. The fourth lens unit L4 is a focusing lens (focus lens) and is movable in the optical axis direction by a linear ultrasonic motor (piezoelectric actuator) 124 held by the third base barrel 120.

The linear ultrasonic motor 124 includes a fixed portion 125 and a movable portion 126. Ultrasonically vibrating the piezoelectric element moves the movable portion 126 in the optical axis direction. The piezoelectric element is electrically connected to the control board 107 by an unillustrated flexible printed circuit (FPC).

A fifth lens unit (first lens unit) L5 is held by the fifth barrel (first holding member) 127.

The first lens unit L1, the third lens unit L3, and the fifth lens unit L5 move during zooming. An unillustrated cam follower is fixed to the linear movement barrel 112, the third base barrel 120, and the fifth barrel 127. Each cam follower is engaged with a linear groove provided in the guide barrel 102 and a cam groove provided in the cam ring 104. As the cam ring 104 rotates, the linear movement barrel 112, the third base barrel 120, and the fifth barrel 127 linearly move in the optical axis direction.

The fourth lens unit L4 is held by the third base barrel 120, and moved with the third base barrel 120 during zooming in the optical axis direction by the linear ultrasonic motor 124.

FIG. 2 illustrates the moving locus of each lens from a collapsed (or retracted) state (SINK) to a telephoto state (TELE) by setting the mount 101 to a reference. A state from a wide-angle state (WIDE) to the telephoto state is an imaging state, and a state from the collapsed state to the wide-angle state is a non-imaging state having an overall lens length shorter than that of the imaging state. L1, L2, L3, and L5 indicate the moving loci of the first lens unit L1, the second lens unit L2, the third lens unit L3, and the fifth lens unit L5, respectively. The second lens unit L2 does not move during zooming. "L4 infinity" indicates the moving locus of the fourth lens unit L4 in an in-focus state at infinity (infinity state). "L4 closest" indicates the moving locus of the fourth lens unit L4 in an in-focus state on the closest distance (closest distance state). At each focal length from the wide-angle state to the telephoto state, position information about the fourth lens unit L4 that is in focus on each focus position from infinity to the closest distance is stored. The linear ultrasonic motor 124 controls the fourth barrel 122 so that the fourth lens unit L4 follows the line illustrated in FIG. 2 based on the stored position information about the fourth lens unit L4 and the zoom position acquired by the zoom sensor 106.

Figure 3:
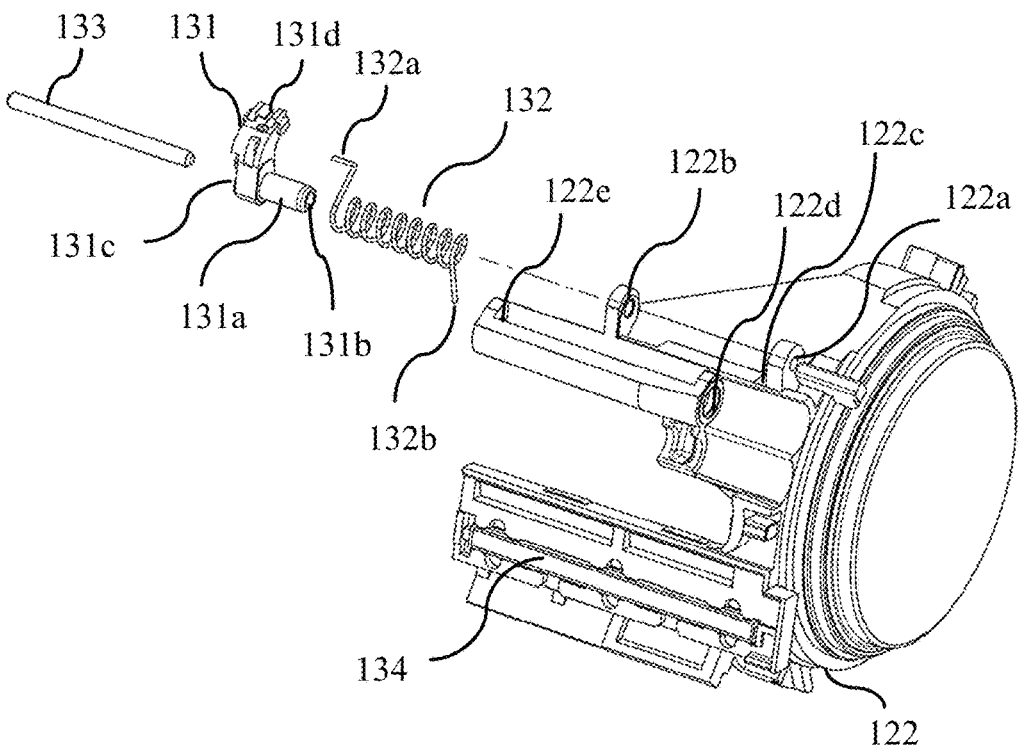
FIG. 3 is an exploded perspective view illustrating the structure of a rack holder in a fourth barrel.
Figure 4:
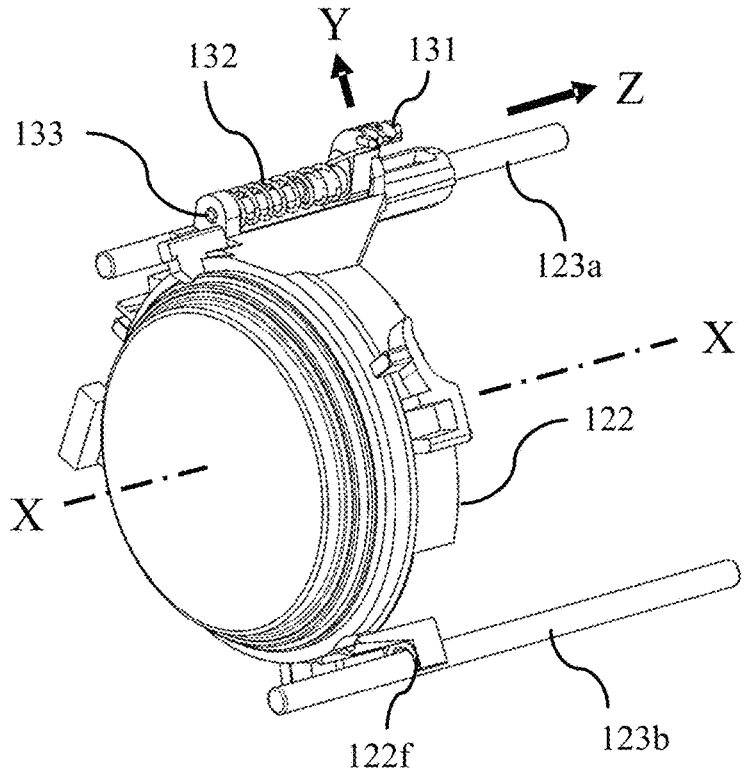
FIG. 4 is a perspective view illustrating the fourth barrel assembled with a rack.

A description will now be given of the holding structure of the fourth barrel 122. FIG. 3 is an exploded perspective view illustrating the structure of the rack holder of the fourth barrel 122. FIG. 4 is a perspective view illustrating a state in which a rack (transmission member) 131 is assembled into the fourth barrel 122.

The shaft portion 131a of the rack 131 is inserted into a rack spring (biasing member) 132, and then inserted into rack shaft holes 122a and 122b of the fourth barrel 122. Thereafter, a rack guide shaft 133 is assembled so as to pass through the rack shaft holes 122a and 122b and a sliding hole 131b in the rack 131. The rack guide shaft 133 is steadily fixed to the fourth barrel 122 by press-fitting the end portion into the rack shaft hole 122*a*. Due to the above configuration, the rack 131 is held movably in the optical axis direction relative to the rack guide shaft 133 and rotatably around the axis of the rack guide shaft 133.

The rack 131 is always biased in the Z direction illustrated in FIG. 4, which is parallel to the optical axis, by the biasing force of the rack spring 132, and the end 131*c* of the rack 131 is always contacts the fourth barrel 122 on the side of the rack shaft hole 122*b*.

A hook portion 132*a* of the rack spring 132 is engaged with the rack 131, and an extension portion 132*b* on the opposite side is inserted into a spring hook hole 122*c* provided in the fourth barrel 122. Thereby, the rack 131 is always biased in the Y direction illustrated in FIG. 4 while the rack guide shaft 133 is set as a rotation center.

A V-groove portion 131*d* at the tip of the rack 131 is always engaged with an unillustrated protrusion provided to the movable portion 126 of the linear ultrasonic motor 124. Thereby, even if there are variations in component accuracy, the driving force of the linear ultrasonic motor 124 can be steadily transmitted to the fourth barrel 122 irrespective of the biasing force.

In this embodiment, the second output unit includes a scale 134 adhered to the groove in the fourth barrel 122 and an unillustrated position sensor attached to the third base barrel 120 side. A continuous pattern is formed on the scale 134 in the optical axis direction. The position sensor reads the pattern formed on the scale 134 and detects the relative position of the fourth barrel 122 relative to the third base barrel 120 in the optical axis direction. The detected result is output to the control board 107.

Both ends of guide bars 123*a* and 123*b* are fixed to the third base barrel 120. The guide bar 123*a* is inserted into sleeve holes 122*d* and 122*e* provided in the fourth barrel 122 and holds the fourth barrel 122 movably in the optical axis direction. The guide bar 123*b* is engaged with a U-shaped groove 122*f* in the fourth barrel 122 and restrains the fourth barrel 122 from rotating around the guide bar 123*a*.

Figure 5:
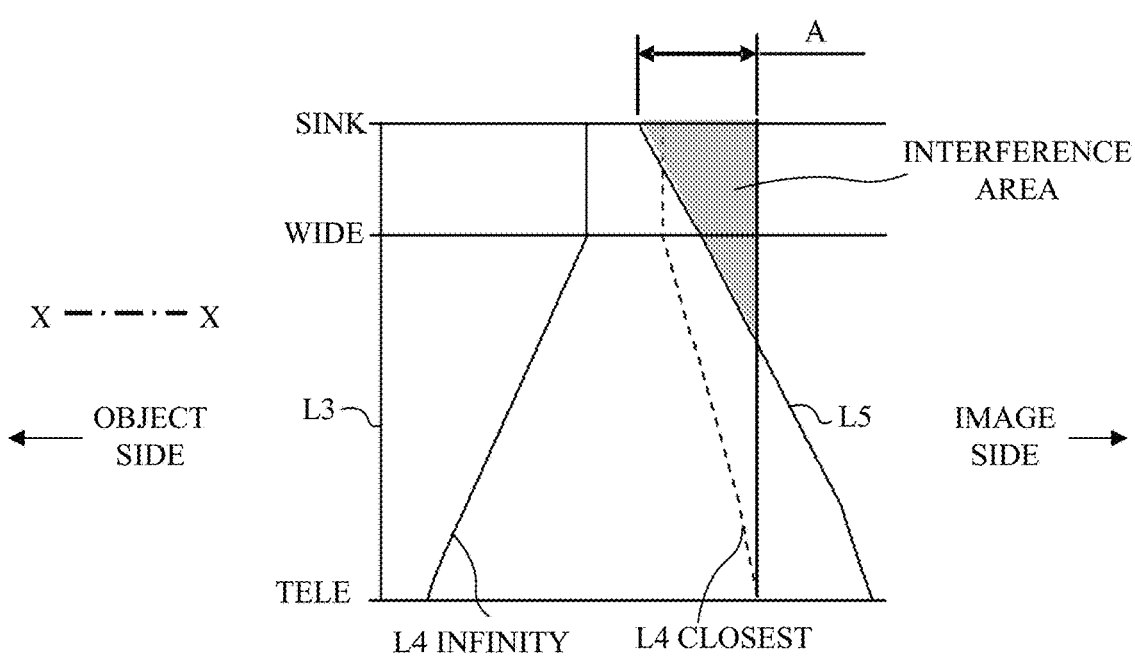
FIG. 5 illustrates the moving loci of the fourth lens unit and a fifth lens unit in the first embodiment.

A description will now be given of a method of moving the fourth lens unit L4 as a focusing lens. FIG. 5 illustrates the moving loci of the fourth lens unit L4 and the fifth lens unit L5 from the collapsed state to the telephoto state by setting the third base barrel 120 to a reference. "L4 infinity" illustrates the moving locus of the fourth lens unit L4 in an in-focus state at infinity. "L4 closest" indicates a moving locus of the fourth lens unit L4 in the closest state. L5 indicates the moving locus of the fifth lens unit L5. A distance between lines in the optical axis direction indicates the clearance of each group. Therefore, in a case where the lines intersect each other, it indicates that the lens barrels interfere with each other.

As described above, at each focal length from the wide-angle state to the telephoto state, the position information about the fourth lens unit L4, which is in focus on each focus position from infinity to the closest distance, is stored. The linear ultrasonic motor 124 controls the fourth barrel 122 so that the fourth lens unit L4 follows the line illustrated in FIG. 4 based on the stored position information about the fourth lens unit L4 and the zoom position acquired by the zoom sensor 106. More specifically, in the infinity state, the linear ultrasonic motor 124 controls the fourth barrel 122 so that the fourth lens unit L4 follows the line indicated as "L4 infinity" during zooming. In the closest state, the linear ultrasonic motor 124 controls the fourth barrel 122 so that the fourth lens unit L4 follows the line indicated as "L4 closest" during zooming.

The fourth barrel 122 is electrically controlled during zooming, but zooming may be performed by a manual operation or by an external driving unit. Therefore, the moving speed of the fourth lens unit L4 is limited and may not achieve high-speed zooming. During zooming using the built-in motor, the above problem does not occur by properly controlling the speed of the built-in motor.

In this embodiment, in a case where the telephoto state and the closest state (telephoto closest state) are changed to the collapsed state at high speed, the fourth barrel 122 may not quickly move and may interfere with the fifth barrel 127. FIG. 5 illustrates a possible interference range as the interference area. In a case where an interference amount is a maximum amount (predetermined amount) A, the positions of the fourth barrel 122 and the fifth barrel 127 are respectively the positions in the telephoto state and the closest distance and the positions in the collapsed state.

The interference amount depends on the zooming speed and the actuator speed of the focus lens in the normal imaging state. In a case where the lens barrel is detached from the camera body and powered off in the telephoto closest state, the focus lens cannot be moved. At this time, in a case where the barrel is changed to the collapsed state, the fourth barrel 122 and the fifth barrel 127 interfere each other by the maximum amount A. That is, in the lens barrel according to this embodiment, the moving range of the fifth lens unit L5 and the moving range of the fourth lens unit L4 overlap each other by the maximum amount A.

Figure 6:
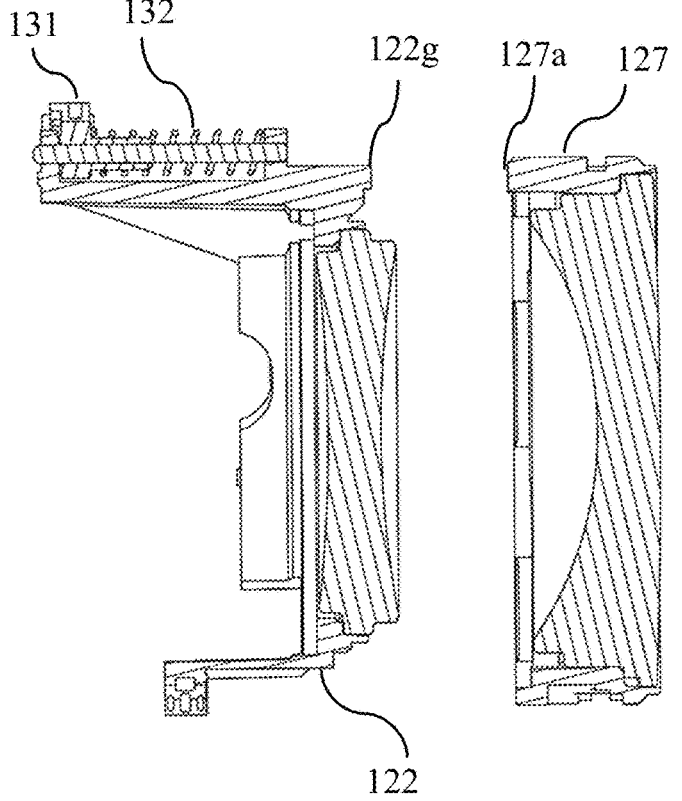
FIG. 6 is a sectional view of the fourth and fifth barrels in a normal state.
Figure 7:
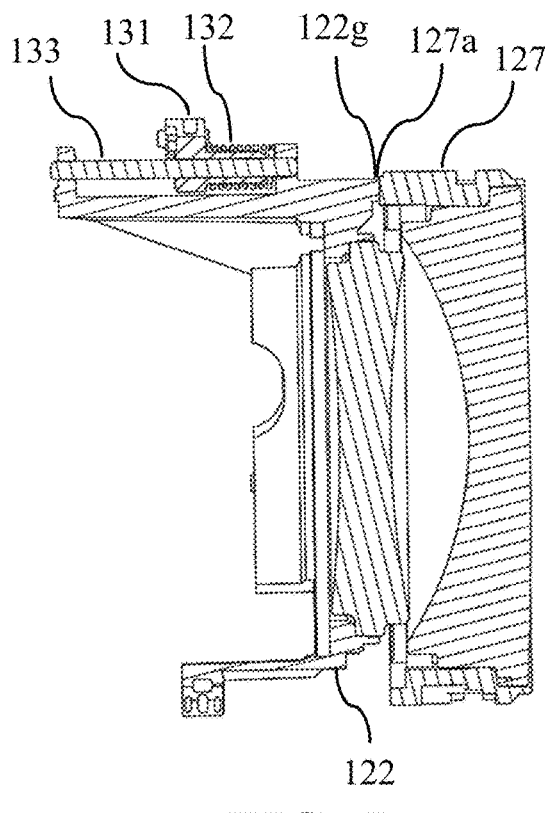
FIG. 7 is a sectional view of the fourth and fifth barrels in an interference state.
Figure 8:
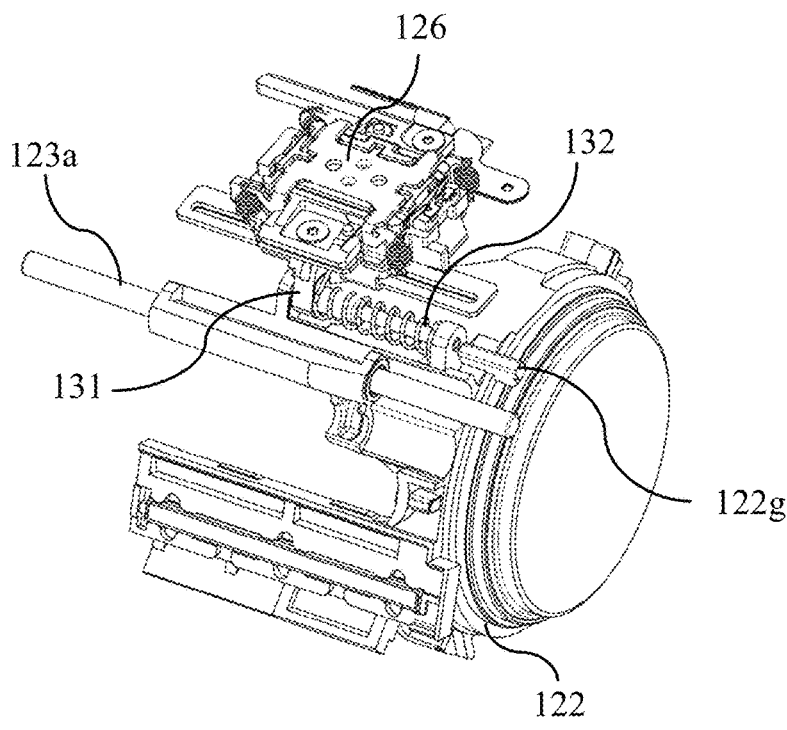
FIG. 8 is a perspective view illustrating the fourth barrel and rack in a normal state.
Figure 9:
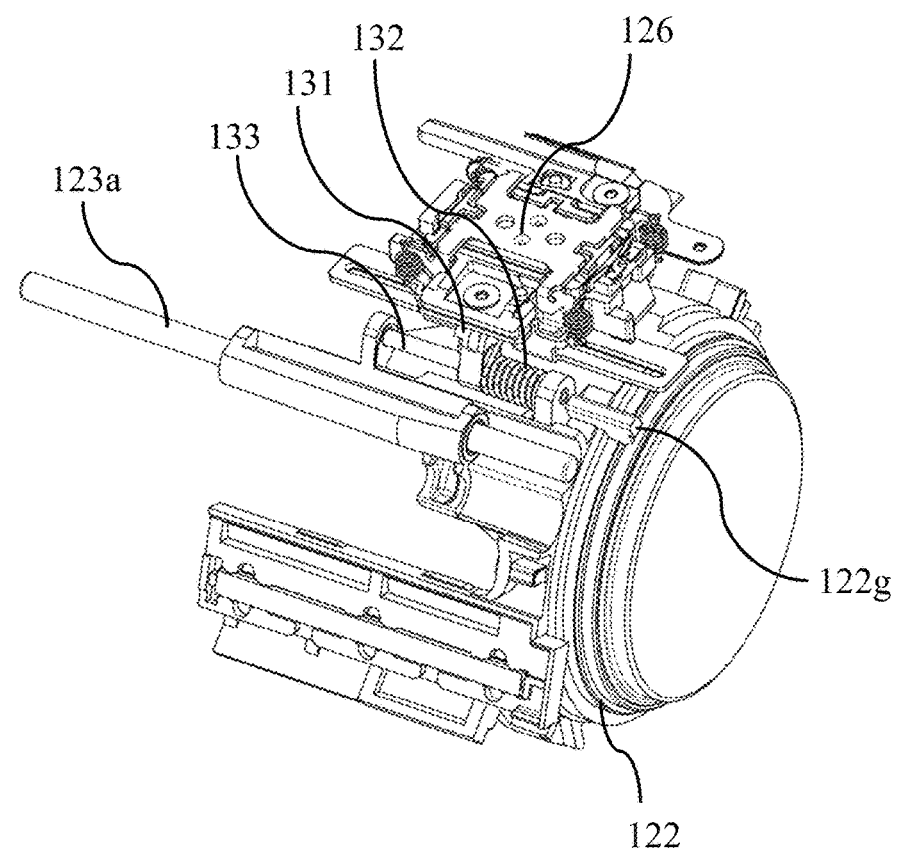
FIG. 9 is a perspective view illustrating the state of the fourth barrel and the rack in an interference state.

A description will now be given of the operation in a case where the fourth barrel 122 and the fifth barrel 127 interfere. FIG. 6 is a sectional view of the fourth barrel 122 and the fifth barrel 127 in a normal state where the fourth barrel 122 and the fifth barrel 127 do not interfere. FIG. 7 is a sectional view of the fourth barrel 122 and the fifth barrel 127 in an interference state where the fourth barrel 122 and the fifth barrel 127 interfere. FIG. 8 is a perspective view illustrating the fourth barrel 122 and the rack 131 in a normal state. FIG. 9 is a perspective view illustrating the fourth barrel 122 and the rack 131 in the interference state.

As illustrated in FIG. 7, in a case where high-speed zooming is performed from the telephoto state, or in a case where the power is shut down in the telephoto closest state and zooming is performed to the retracted state, a contact portion 122*g* of the fourth barrel 122 and a contact portion 127*a* of the fifth barrel 127 contact each other. As a result, the fourth barrel 122 is pressed in the optical axis direction by the fifth barrel 127. Since the rack 131 is held by the movable portion 126 of the linear ultrasonic motor 124 and the movable portion 126 is stationary due to the frictional force with the fixed portion 125, the rack spring 132 is compressed and the rack guide shaft 133 slides. That is, the rack spring 132 is elastically deformable by the maximum amount A to the side opposite to the fifth barrel 127 in the optical axis direction relative to the rack 131. The fourth barrel 122 moves with the fifth barrel 127 in the optical axis direction. This state will be called a retracted state. Therefore, even if interference occurs, damages to the fourth barrel 122, fifth barrel 127, rack 131, and linear ultrasonic motor 124 can be suppressed.

The conventional lens barrel is configured by an optical design that prevents another lens from being placed within the moving range of a focus lens that is electrically moved. In other words, the clearance with another lens disposed so as not to interfere with the moving range of the focus lens in the telephoto state was provided even in the wide-angle state. Since the moving amount of the focus lens in the wide-angle state may be often smaller than that in the telephoto state, unnecessary clearance was often created and the overall length of the lens increased.

This embodiment can minimize the clearance between unnecessary lenses and make more compact the entire lens barrel by permitting the interference of the focus lens during high-speed zooming.

Figure 19:
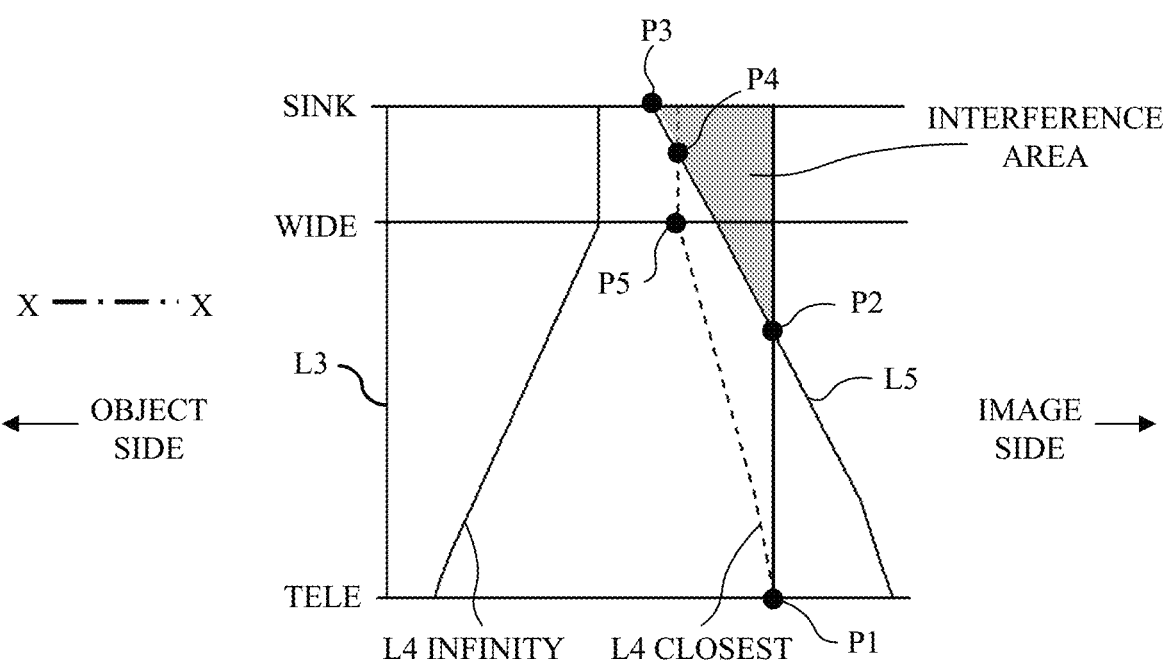
FIG. 19 illustrates a conventional control method in FIG. 5.
Figure 20A:
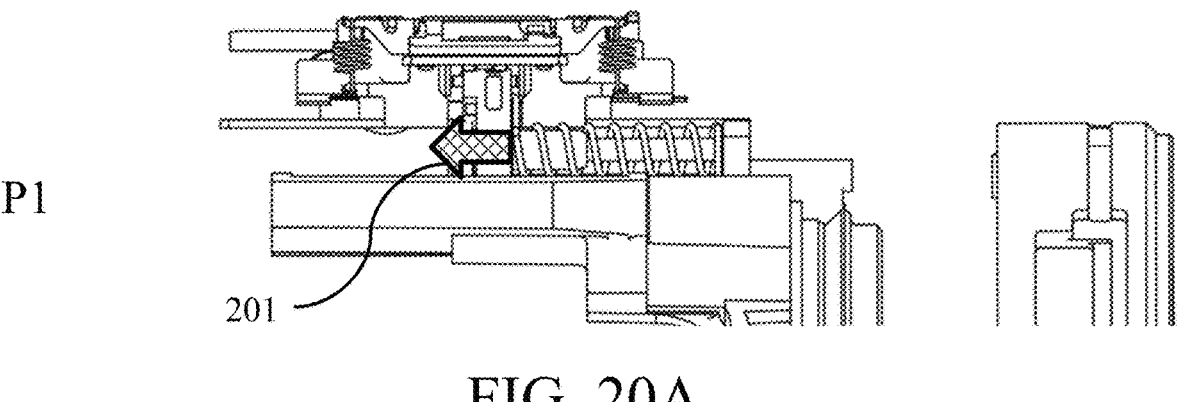
FIGS. 20A, 20B, and 20C illustrate force relationships in FIG. 19.
Figure 20B:
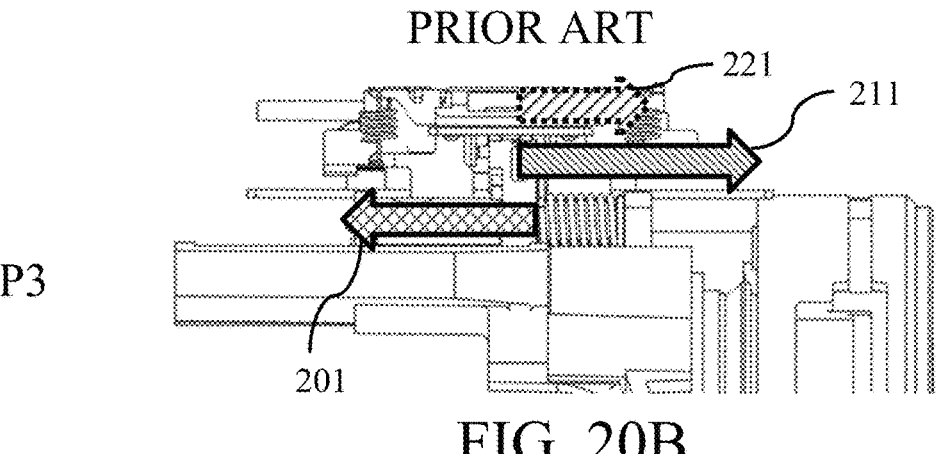
Figure 20C:
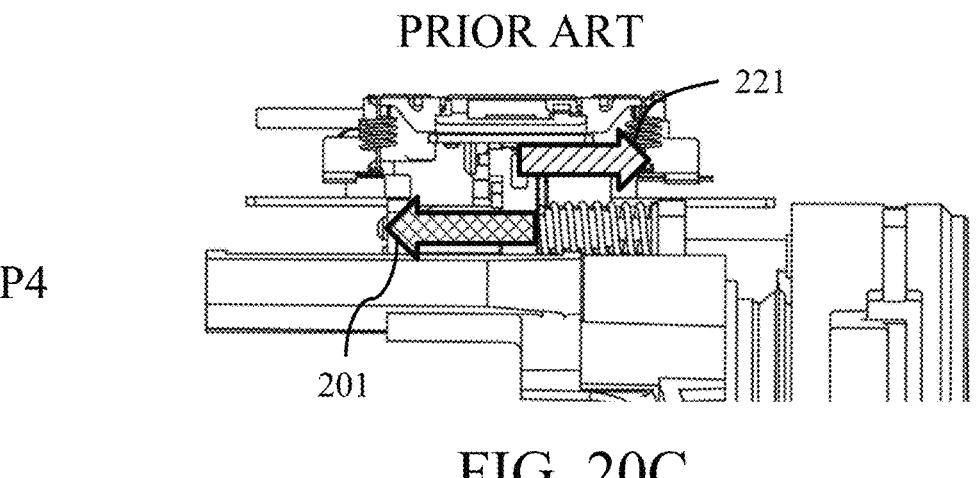

A description will now be given of a method of controlling the linear ultrasonic motor 124. Referring now to FIGS. 19, 20A, 20B, and 20C, a description will be given of problems caused by the conventional method of controlling the linear ultrasonic motor 124. FIG. 19 explains the conventional control method in FIG. 5. FIGS. 20A, 20B, and 20C illustrate the force relationships in FIG. 19. FIGS. 20A to 20C each illustrate the force relationships in a state where the fourth lens unit L4 is located at positions P1, P3, and P4.

In a case where the lens barrel is detached from the camera body and the power is shut down in the telephoto closest state (fourth lens unit L4 is located at position P1) and then the state changes to the collapsed state, the fourth lens unit L4 and fifth lens unit L5 start interfering each other when the fifth lens unit L5 reaches position P2. Thereafter, the fourth lens unit L4 and fifth lens unit L5 move to position P3.

In FIG. 20A, the rack 131 and fourth barrel 122 are integrated by the biasing force 201 of the rack spring 132. In FIG. 20B, the largest interference amount provides the largest biasing force 201, but the rack 131 is held in place by a static frictional force 211 between the movable portion 126 of the linear ultrasonic motor 124 and the fixed portion 125. That is, when the fourth lens unit L4 is located at position P3, the static frictional force 211 is greater than the biasing force 201. In a case where the lens barrel is attached to the camera body and powered on while the fourth lens unit L4 is located at position P3, and then the zoom state changes to the wide-angle state and the fourth lens unit L4 reaches position P4, the fourth lens unit L4 shifts from the line indicated as "L4 closest."

The conventional control method drives the linear ultrasonic motor 124 so that when the fourth lens unit L4 shifts from the line indicated as L4, it returns to the position on the line indicated as "L4 closest." In this case, the static frictional force 211 changes to a dynamic frictional force 221, so when the fourth lens unit L4 is located at position P4, the biasing force 201 is larger than the dynamic frictional force 221, the movable portion 126 slips and is worn out, and the focusing performance may deteriorate.

Figure 10:
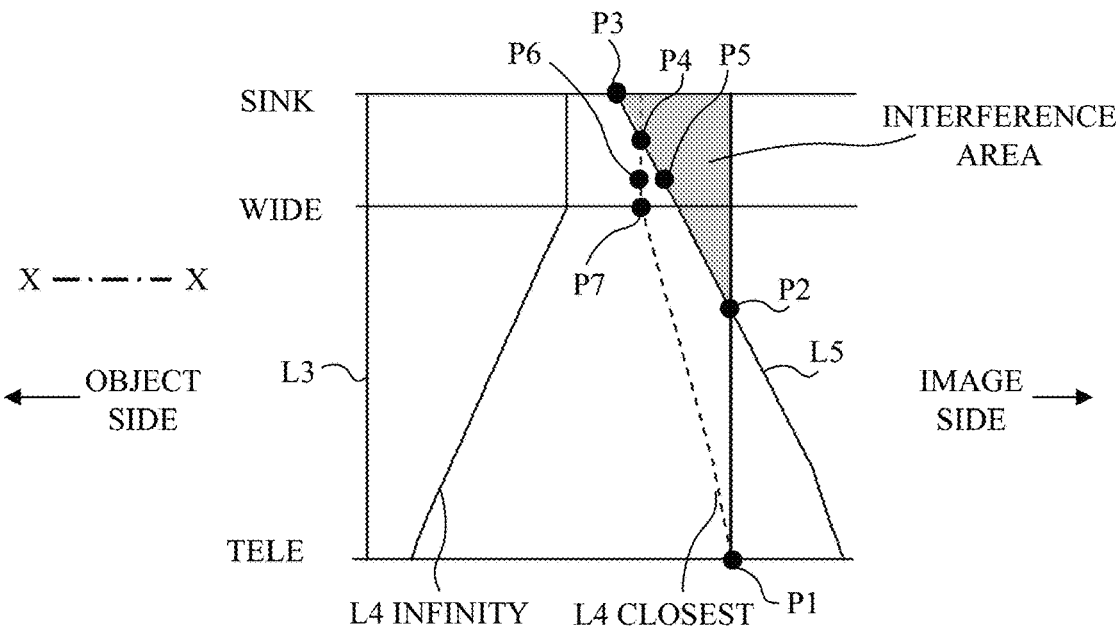
FIG. 10 illustrates a control method according to this embodiment in FIG. 5.

Referring now to FIGS. 10 to 11D, a description will be given of a method for controlling the linear ultrasonic motor 124 according to this embodiment. FIG. 10 illustrates the control method according to this embodiment in FIG. 5. FIGS. 11A, 11B, 11C, and 11D illustrate the force relationships in FIG. 10. FIGS. 11A to 11D each illustrate the force relationships when the fourth lens unit L4 is located at positions P1, P3, P4, and P5.

As illustrated in FIG. 11C, when the fourth lens unit L4 is located at position P4, the biasing force 201 is larger than the dynamic frictional force 221, but this embodiment does not drive the linear ultrasonic motor 124. After the fourth lens unit L4 reaches position P5 where the dynamic frictional force 221 is larger than the biasing force 201, the linear ultrasonic motor 124 is driven to move the fourth lens unit L4 to position P6. Thereafter, the fourth lens unit L4 moves to position P7 in the wide-angle state and the closest state (wide-angle closest state).

The control method according to this embodiment drives the linear ultrasonic motor 124 after the dynamic frictional force 221 becomes larger than the biasing force 201.

Thereby, the movable portion 126 does not slip or no wear occurs, and thus deterioration of focusing performance can be suppressed.

Figure 12:
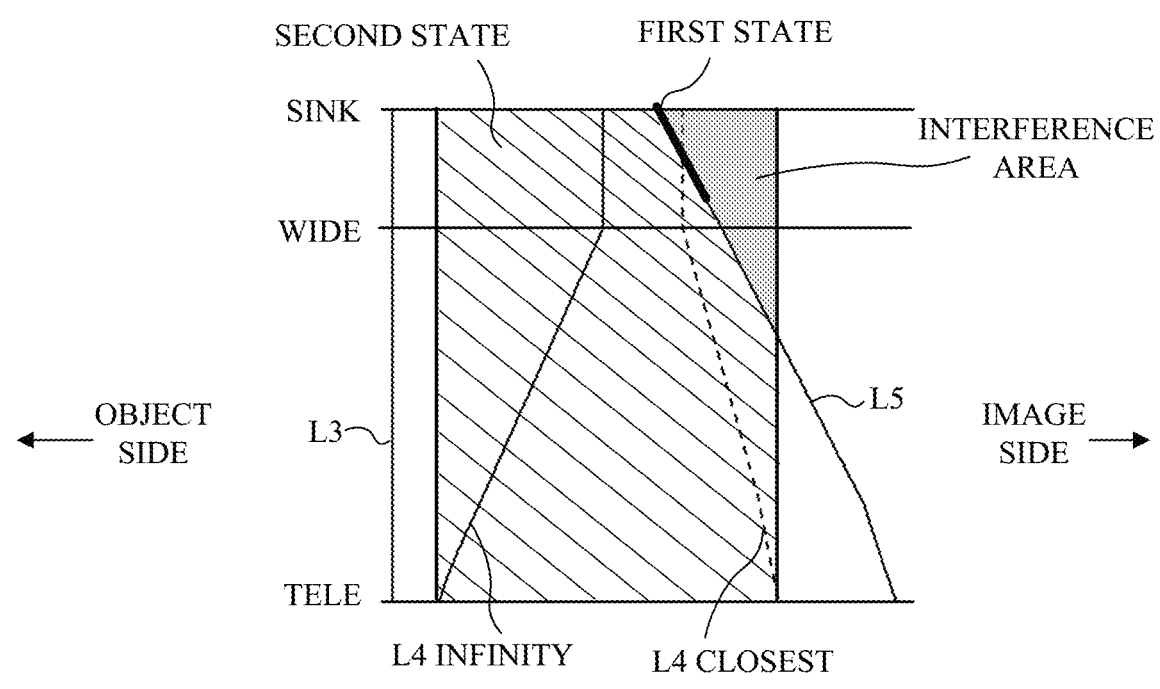
FIG. 12 illustrates an example method for determining a first state and a second state.

FIG. 12 illustrates a method of determining whether the lens barrel is in the first state or the second state by detecting the zoom position and focus position. In this embodiment, the first state is a state in which the movable portion 126 is likely to slip from position P3 to position P5 in FIG. 10, and the driving of the linear ultrasonic motor 124 is restricted. The second state is a state in which the movable portion 126 is not likely to slip, and the driving of the linear ultrasonic motor 124 is permitted.

In this embodiment, the control board 107 determines whether the lens barrel is in the first state or the second state according to the zoom position and focus position acquired based on the output results of the first output unit and the second output unit. This embodiment drives the linear ultrasonic motor 124 in a case where the lens barrel is in the first state. In a case where it is determined that the lens barrel is in the second state and the focus position is not a desired position, the linear ultrasonic motor 124 is driven. In this embodiment, the first state and the second state are determined according to the position at which the movable portion 126 does not slip even with the largest biasing force 201, but this embodiment is not limited to this example. The first state and the second state may be determined according to whether the fourth lens unit L4 is in the wide-angle state and located at the desired position.

Figure 13:
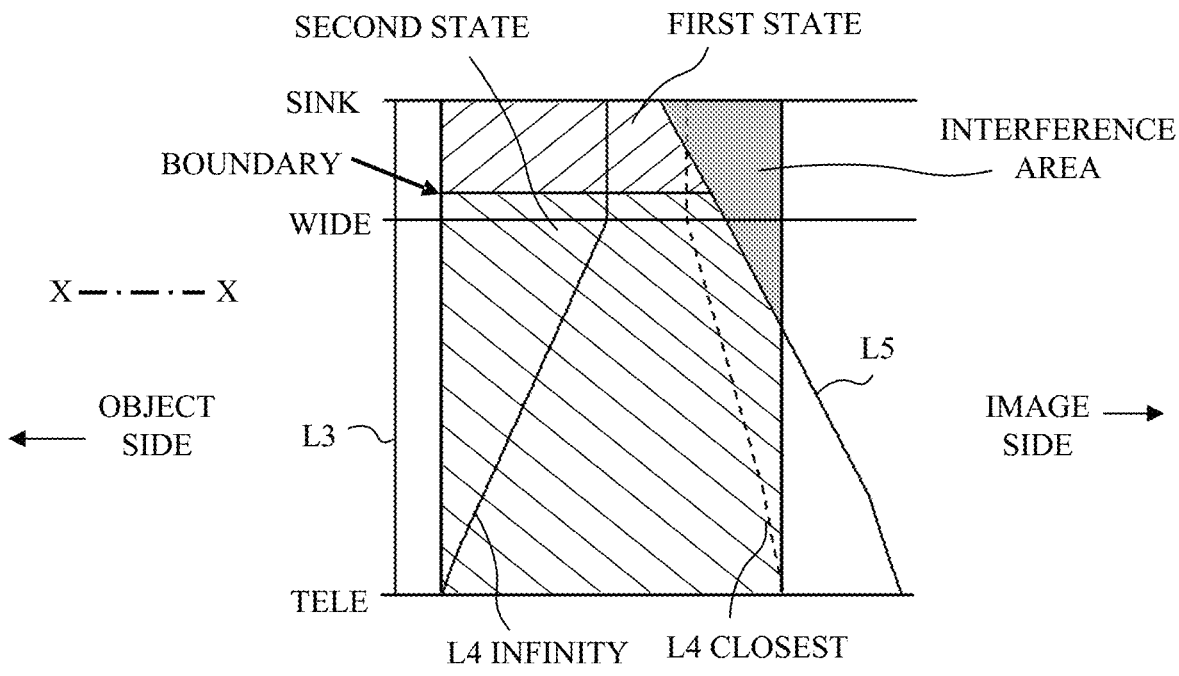
FIG. 13 illustrates another example method for determining the first state and the second state.
Figure 14:
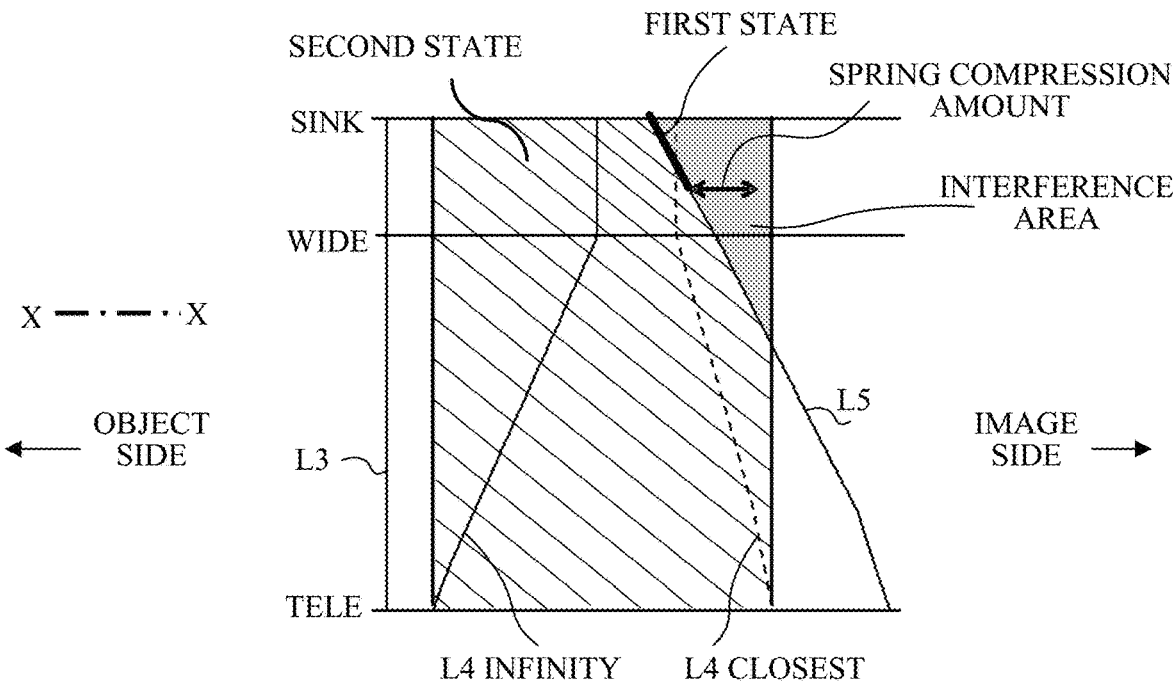
FIG. 14 illustrates still another example method for determining the first state and the second state.

The control board 107 in this embodiment determines whether the lens barrel is in the first state or the second state according to the zoom position and the focus position, but this embodiment is not limited to this example. For example, as illustrated in FIG. 13, it may be determined whether the lens barrel is in the first state or the second state according to the zoom position. In this case, the control board 107 can determine whether the lens barrel is in the first state or the second state, using a smaller amount of information. As illustrated in FIG. 14, it may be determined whether the lens barrel is in the first state or the second state according to the zoom position, the focus position, and the compression amount of the rack spring 132. In this case, since a compression amount of the rack spring 132 is also considered in the determination, the position where the movable portion 126 does not slip can be accurately determined. The compression amount of the biasing member can be determined, for example, from a difference between the position of the rack 131 or the movable portion 126 and the position of the fourth barrel 122. In this case, a third output unit may be provided that detects the rack 131 and outputs the detection result to the control board 107. It can also be determined from a difference between the position of the fourth barrel 122 in a case where the power is cut off and the current position of the fourth barrel 122. Furthermore, it may be determined whether the lens barrel is in the first state or the second state according to the zoom position and the compression amount of the rack spring 132.

The fourth barrel 122 may be moved to infinity, or may be moved to a desired position between the closest distance and infinity.

The above is applied not only when the lens barrel is detached from the camera body and powered off in the telephoto closest state in which the fourth lens unit L4 is located at position P1 and then the state is changed to the collapsed state, but also when the lens barrel changes to the collapsed state after the power is turned off or when the state is quickly changed to the collapsed state.

In this embodiment, the retracting direction exists in the range of the maximum amount A in FIG. 5 and on the image side (imaging surface side) in the optical axis direction, but it may exist on the object side or both sides.

Figure 15:
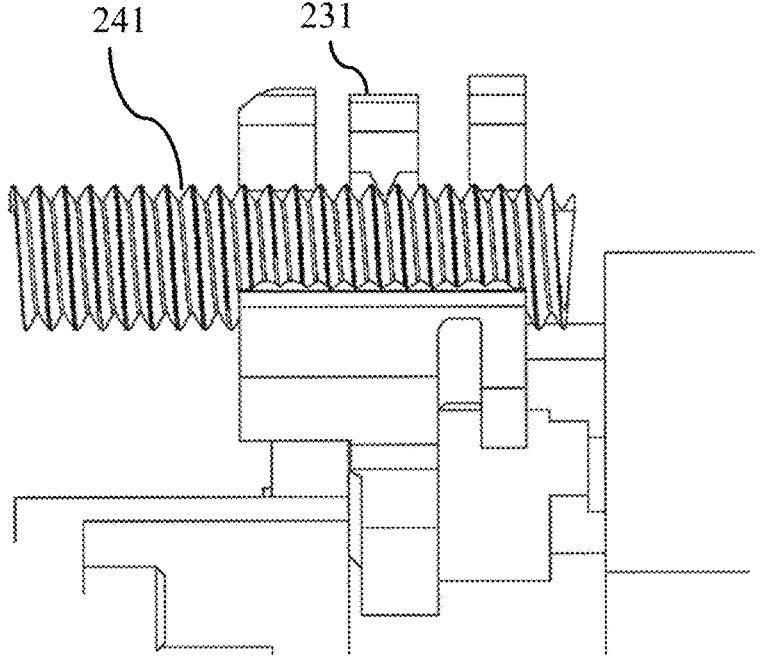
FIG. 15 illustrates the rack and lead screw.
Figure 16A:
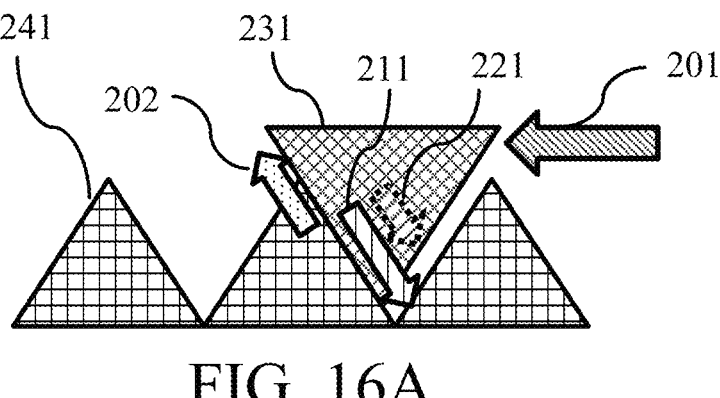
FIGS. 16A, 16B, and 16C illustrate force relationships in FIG. 15.
Figure 16B:
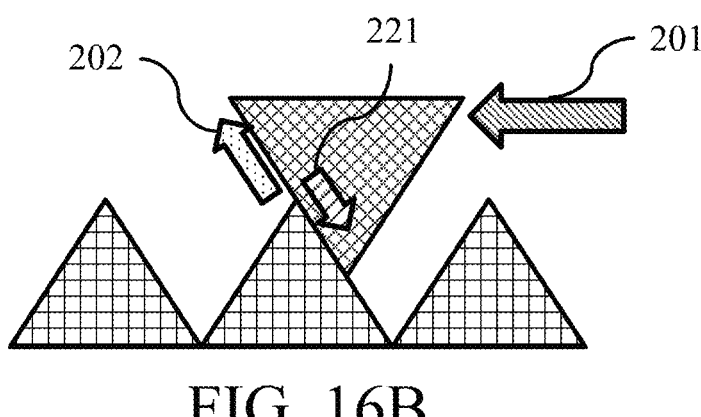
Figure 16C:
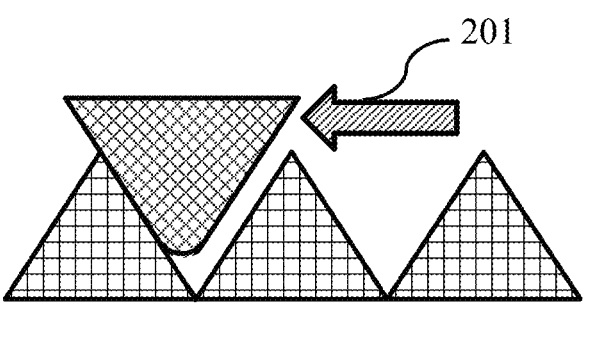

This embodiment moves the fourth barrel 122 using the linear ultrasonic motor 124, but may use another driving unit such as a stepping motor. Referring now to FIGS. 15, 16A, 16B, and 16C, a description will be given of the effects of using a stepping motor. FIG. 15 illustrates the rack (transmission member) 231 and the lead screw 241. FIGS. 16A, 16B, and 16C illustrate the force relationships in FIG. 15, and illustrate a cog of the rack 231 and cogs of the lead screw 241.

The rack 231 is biased toward the lead screw 241 by an unillustrated biasing member, and the cogs of the rack 231 and the cogs of the lead screw 241 are engaged with each other. As the lead screw 241 is rotated by the unillustrated stepping motor, the rack 231 moves in the optical axis direction. A biasing force 201 is applied to the rack 231 from the right to the left in the drawing by a biasing member. The rack 231 moves together with the unillustrated fourth barrel 122.

FIG. 16A illustrates the force relationship when the fourth lens unit L4 is located at position P4 in FIG. 10 and the stepping motor is not driven. In FIG. 16A, the biasing force 201 is the biasing force 202 in the slope direction, and the static frictional force 211 is larger than the biasing force 202. In a case where the stepping motor is driven from the state illustrated in FIG. 16A, the biasing force 202 becomes larger than the dynamic frictional force 221 as illustrated in FIG. 16B, and the rack 231 starts sliding toward the upper left in the slope direction. Then, a cog jump occurs as illustrated in FIG. 16C. Moreover, the tip of the cog of the rack 231 is rounded due to the cog jump, and the cogs of the rack 231 become more likely to jump. Accordingly, applying the control method according to this embodiment to the stepping motor as well can solve the above problem because the rack 231 will not slip.

While this embodiment has discussed an interchangeable lens for capturing a still image and a moving image, a similar effect may be obtained for manual zooming in a lens barrel for recording images. This embodiment is not limited to the focus lens inside the lens barrel, but can be applied to another lens that moves during zooming, or to miniaturization of the lens barrel using contact with a fixed portion.

Second Embodiment

This embodiment will discuss only the differences from the first embodiment.

The first embodiment has described a collapsible lens, but this embodiment will discuss a non-collapsible lens. That is, in the first embodiment, the boundary between the first state and the second state is in the non-imaging state, but in this embodiment, the boundary between the first state and the second state is in the imaging state.

Figure 17:
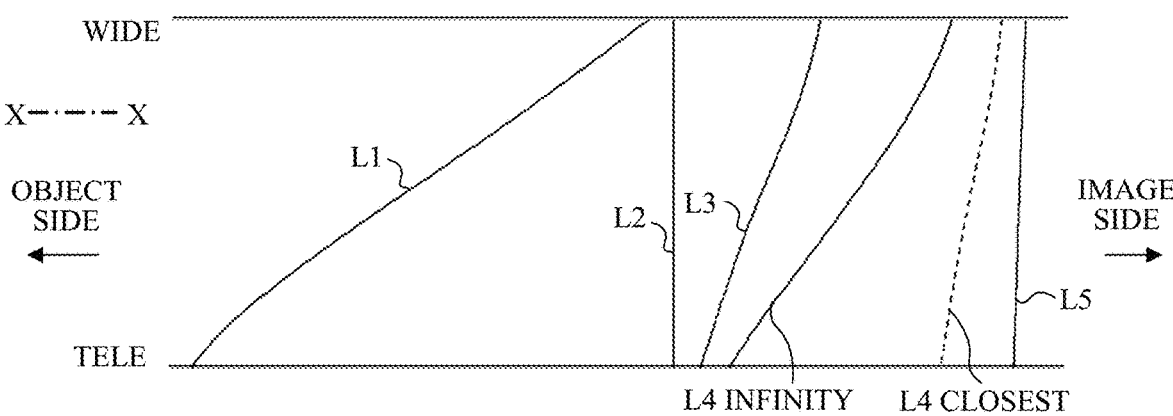
FIG. 17 illustrates a moving locus of each lens in a second embodiment.
Figure 18:
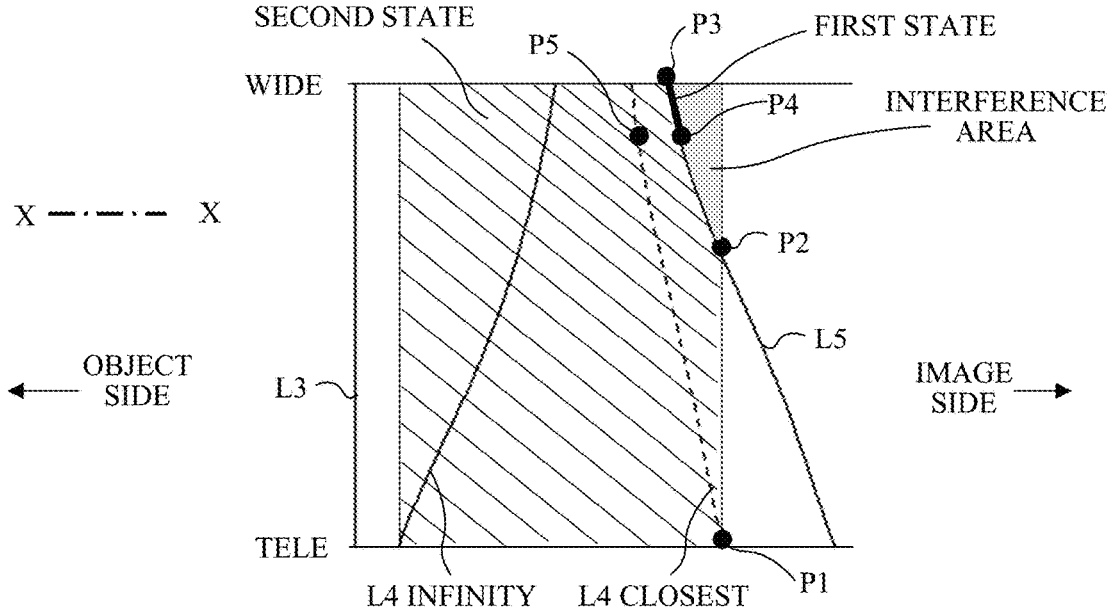
FIG. 18 illustrates moving loci of a fourth barrel and a fifth barrel in the second embodiment.

FIG. 17 illustrates a moving locus of each lens from the collapsed state to the telephoto state by setting the mount 101 to a reference. L1, L2, L3, and L5 indicate the moving loci of the first lens unit L1, the second lens unit L2, the third lens unit L3, and the fifth lens unit L5, respectively. "L4 infinity" indicates the moving locus of the fourth lens unit L4 in the in-focus state at infinity. "L4 closest" indicates the moving locus of the fourth lens unit L4 in the closest state. FIG. 18 illustrates the moving loci of the fourth lens unit L4 and the fifth lens unit L5 from the wide-angle state to the telephoto state by setting the third base barrel 120 to a reference.

In a case where the lens barrel is detached from the camera body and powered off in the telephoto closest state (when the fourth lens unit L4 is located at position P1) and changed to the wide-angle state, and the fifth lens unit L5 reaches position P2, the fourth lens unit L4 and the fifth lens unit L5 start interfering with each other. Thereafter, the fourth lens unit L4 and the fifth lens unit L5 move to position P3. In a case where the fourth lens unit L4 is located at position P3, the lens barrel is in the first state, that is, a state in which the movable portion 126 may slip, so it is necessary to move the zoom position to position P4 where the movable portion 126 does not slip. Therefore, when zooming is performed using the built-in motor, the zoom position is moved to position P4. When manual zooming is performed, it is necessary to notify the user that the area is a prohibited area where focus driving is restricted (the lens barrel is in the first state), and to have the user move the zoom position to position P4. Therefore, a notifying unit may be provided to notify that the lens barrel is in the first state. After the fourth lens unit L4 reaches position P4 where the lens barrel is in the second state, the linear ultrasonic motor 124 is driven to move the fourth lens unit L4 to position P5. Thus, even in the non-collapsible lens, driving of the linear ultrasonic motor 124 is restricted in the first state, and after the zoom position is moved and the lens barrel changes to the second state, driving of the linear ultrasonic motor 124 is allowed. Thereby, the movable portion 126 does not slip, so no wear occurs, and deterioration of focusing performance can be suppressed.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each embodiment can provide a lens barrel that has a configuration in which a lens unit that is moved by a manual operation or by an external driving unit enters a moving range of a lens unit that is moved by an electric driving unit, and can suppress focusing performance deterioration even when an interference amount is large.

This application claims the benefit of Japanese Patent Application No. 2023-046248, which was filed on Mar. 23, 2023, and which is hereby incorporated by reference herein in its entirety.

What is claimed is:

1. A lens barrel comprising:
a first holding member configured to hold a first lens unit that is movable in an optical axis direction;
a second holding member configured to hold a second lens unit that is movable in the optical axis direction;
a transmission member configured to move the second holding member in the optical axis direction;
a driving unit configured to move the transmission member in the optical axis direction;
a processor configured to control the driving unit; and
a first output unit configured to output information about a position of the first holding member,
wherein a moving range of the first lens unit and a moving range of the second lens unit overlap each other in the optical axis direction by a predetermined amount,
wherein the second holding member includes a biasing member that is deformable in the optical axis direction by at least the predetermined amount to a side opposite to the first holding member relative to the transmission member,
wherein the lens barrel has a first state for restricting driving of the driving unit, and a second state for permitting driving of the driving unit, and
wherein the processor determines whether the lens barrel is in the first state or the second state, using an output result from the first output unit.

2. The lens barrel according to claim 1, wherein the lens barrel includes an imaging state, and a non-imaging state having an overall length of the lens barrel shorter than that of the imaging state.

3. The lens barrel according to claim 2, wherein a boundary between the first state and the second state is within the non-imaging state.

4. The lens barrel according to claim 2, wherein a boundary between the first state and the second state is within the imaging state.

5. The lens barrel according to claim 4, further comprises a notifying unit configured to notify that the lens barrel is in the first state in a case where the processor determines that the lens barrel is in the first state.

6. The lens barrel according to claim 1, wherein the driving unit is a piezoelectric actuator.

7. The lens barrel according to claim 1, wherein the driving unit is a stepping motor connected to a lead screw.

8. The lens barrel according to claim 1, further comprising a second output unit configured to output information about a position of the second holding member, wherein the processor determines whether the lens barrel is in the first state or the second state, using the information about the position of the first holding member and the information about the position of the second holding member.

9. The lens barrel according to claim 8, further comprising a third output unit configured to output information about a position of the transmission member,
wherein the processor determines whether the lens barrel is in the first state or the second state, using the information about the position of the first holding member, the information about the position of the second holding member, and the information about the position of the transmission member.

10. The lens barrel according to claim 1, further comprising a third output unit configured to output information about a position of the transmission member,
wherein the processor determines whether the lens barrel is in the first state or the second state, using the information about the position of the first holding member and the information about the position of the transmission member.

11. The lens barrel according to claim 1, wherein the first lens unit is a lens unit configured to move during zooming, and
wherein the second lens unit is a lens unit configured to move during focusing.

12. The image pickup apparatus comprising:
a lens barrel; and
an image sensor configured to receive light from the lens barrel,
wherein the lens barrel includes:
a first holding member configured to hold a first lens unit that is movable in an optical axis direction;
a second holding member configured to hold a second lens unit that is movable in the optical axis direction;
a transmission member configured to move the second holding member in the optical axis direction;
a driving unit configured to move the transmission member in the optical axis direction;
a processor configured to control the driving unit; and
a first output unit configured to output information about a position of the first holding member,
wherein a moving range of the first lens unit and a moving range of the second lens unit overlap each other in the optical axis direction by a predetermined amount,
wherein the second holding member includes a biasing member that is deformable in the optical axis direction by at least the predetermined amount to a side opposite to the first holding member relative to the transmission member,
wherein the lens barrel has a first state for restricting driving of the driving unit, and a second state for permitting driving of the driving unit, and
wherein the processor determines whether the lens barrel is in the first state or the second state, using an output result from the first output unit.

* * * * *